(12) United States Patent
Kim et al.

(10) Patent No.: US 10,118,501 B2
(45) Date of Patent: Nov. 6, 2018

(54) CONTROL METHOD AND SYSTEM FOR CHARGING HIGH VOLTAGE BATTERY OF VEHICLE

(71) Applicant: HYUNDAI MOTOR COMPANY, Seoul (KR)

(72) Inventors: Jee Heon Kim, Guri-si (KR); Ho Joong Lee, Anyang-si (KR); Won Kyoung Choi, Hwaseong-si (KR); Jun Yeon Park, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 260 days.

(21) Appl. No.: 15/086,880

(22) Filed: Mar. 31, 2016

(65) Prior Publication Data
US 2017/0151885 A1   Jun. 1, 2017

(30) Foreign Application Priority Data

Nov. 30, 2015   (KR) .......................... 10-2015-0168826

(51) Int. Cl.
*H02J 7/00* (2006.01)
*B60L 11/18* (2006.01)

(52) U.S. Cl.
CPC ....... *B60L 11/1868* (2013.01); *B60L 11/1861* (2013.01); *B60L 11/1864* (2013.01); *H02J 7/007* (2013.01); *H02J 7/0021* (2013.01); *B60L 2210/12* (2013.01); *Y02T 10/7005* (2013.01); *Y02T 10/7044* (2013.01); *Y02T 10/7061* (2013.01); *Y02T 10/7066* (2013.01); *Y02T 10/7233* (2013.01)

(58) Field of Classification Search
CPC ................................ H02J 7/0021; H02J 7/007

USPC ......................................................... 320/109
See application file for complete search history.

(56) References Cited

U.S. PATENT DOCUMENTS 9,236,805 B2   1/2016  Choi et al.
9,287,766 B2   3/2016  Wagoner et al.
9,871,401 B2 *  1/2018  Lee ....................... H02J 7/1423
(Continued)

FOREIGN PATENT DOCUMENTS

JP    2006-333662 A    12/2006
JP    2009-296820 A    12/2009
(Continued)

OTHER PUBLICATIONS

Office Action issued in corresponding Korean Patent Application No. 10-2015-0168826, dated Aug. 21, 2017.
(Continued)

*Primary Examiner* — Suchin Parihar
(74) *Attorney, Agent, or Firm* — McDermott Will & Emery LLP

(57) ABSTRACT a control method for charging a high voltage battery of a vehicle includes charging, by a vehicle controller, the high voltage battery using a low voltage DC-DC converter The state information. of the low voltage DC-DC converter, which includes the current and the temperature of the low voltage DC-DC converter, is sensed by the vehicle controller while charging the high voltage battery. The charging current of the high voltage battery is derated by the vehicle controller when the sensed state information of the low voltage DC-DC converter satisfies a converter derating condition.

17 Claims, 2 Drawing Sheets

(56) References Cited

U.S. PATENT DOCUMENTS

| | | | |
|---|---|---|---|
| 9,878,623 B2* | 1/2018 | Choi | B60L 11/1811 |
| 2011/0169448 A1* | 7/2011 | Ichikawa | B60K 6/365 |
| | | | 320/109 |
| 2013/0038271 A1* | 2/2013 | Park | B60K 6/28 |
| | | | 320/104 |
| 2014/0369075 A1 | 12/2014 | Choi et al. | |
| 2015/0329001 A1* | 11/2015 | Eifert | H02J 7/00 |
| | | | 320/109 |
| 2016/0105052 A1* | 4/2016 | Lee | H02J 7/0054 |
| | | | 320/101 |
| 2017/0080810 A1* | 3/2017 | Choi | B60L 11/1811 |

FOREIGN PATENT DOCUMENTS

| | | |
|---|---|---|
| JP | 2010-220392 A | 9/2010 |
| JP | 2010-252512 A | 11/2010 |
| JP | 2013-035534 A | 2/2013 |
| JP | 2013-067227 A | 4/2013 |
| JP | 5195603 B2 | 5/2013 |
| KR | 10-2007-0020695 A | 2/2007 |
| KR | 10-2011-0094634 A | 8/2011 |
| KR | 10-2013-0026765 A | 3/2013 |
| KR | 10-2013-0047963 A | 5/2013 |
| KR | 10-1393928 B1 | 5/2014 |

OTHER PUBLICATIONS

Korean Office Action issue in Application No. 10-2015-0168826 dated Jan. 29, 2018.

\* cited by examiner

CONTROL METHOD AND SYSTEM FOR CHARGING HIGH VOLTAGE BATTERY OF VEHICLE

CROSS REFERENCE TO RELATED APPLICATION

The present application claims the benefit of priority to Korean Patent Application No. 10-2015-0168826, filed on Nov. 30, 2015, the entire content of which is incorporated herein for all purposes by this reference.

TECHNICAL FIELD

The present disclosure relates to a control method for charging a high voltage battery of a vehicle, capable of preventing durability o an auxiliary battery and a low voltage DC-DC converter from being degraded when the high voltage battery is charged using the auxiliary battery.

BACKGROUND

Electric vehicles have been actively studied and developed because they are possible alternatives for solving vehicle pollution and energy problems.

Such electric vehicles acquire power by driving an AC or DC motor using battery power. The electric vehicles can be classified into battery electric vehicles and hybrid electric vehicles. A battery electric vehicle drives a motor using the power of a battery and charges the battery when the battery is depleted. A hybrid electric vehicle charges a battery using electric power generated by driving an engine and drives an electric motor using the electric power to drive the vehicle.

Generally, a system for charging a battery of such a hybrid electric vehicle has a charger mounted therein in order to charge a high voltage battery and has a low voltage DC/DC converter (LDC) in order to charge a low voltage battery using the high voltage battery. In other words, the system for charging a vehicle battery charges the high voltage battery when the vehicle stops, and supplies the power to the low voltage battery and electric field load through. the LDC.

Recently, a bidirectional converter has been mainly used for an LDC since the bidirectional converter can improve power loss.

Additionally, a method for charging a high voltage battery using a bidirectional converter has also been studied. However, since the high voltage battery is charged using an auxiliary battery in this method, the durability of an LDC may decrease.

The foregoing is intended merely to aid in the understanding of the background of the present disclosure, and is not intended to mean that the present disclosure falls within the purview of the related art that is already known to those skilled in the art.

SUMMARY

The present disclosure is intended to provide a control method and system for charging a high voltage battery of a vehicle. The method and system secures the performance for starting the vehicle and improves the durability of a low voltage DC-DC converter by limiting a charging current of the high voltage battery depending on states of an auxiliary battery and the low voltage DC-DC converter when the high voltage battery is charged using the auxiliary battery.

According to an exemplary embodiment in the present disclosure, a control method for charging a high voltage battery includes charging, by a vehicle controller, the high voltage battery using a low voltage DC-DC converter. State information of the low voltage DC-DC converter, which includes a current and a temperature of the low voltage DC-DC converter, is sensed by the vehicle controller while charging the high voltage battery. A charging current of the high voltage battery is derated by the vehicle controller when the sensed state information of the low voltage DC-DC converter satisfies a converter derating condition.

The control method may further include, before charging the high voltage battery, sensing, by the vehicle controller, a state of charge (SOC) of the high voltage battery. The sensed SOC of the high voltage battery is compared with a minimum reference SOC by the vehicle controller. A condition for the low voltage DC-DC converter is set by the vehicle controller in order to charge the high voltage battery using an auxiliary battery when the sensed SOC of the high voltage battery is less than the minimum reference SOC.

The setting of the low voltage DC-DC converter may comprise setting, by the vehicle controller, an output voltage command to be lower than a voltage of the auxiliary battery. A duty ratio of an auxiliary switch of the low voltage DC-DC converter is changed by the vehicle controller.

The vehicle controller may change the duty ratio of the auxiliary switch using a difference between the output voltage command and the voltage of the auxiliary battery.

After charging the high voltage battery, the control method may further include sensing, by the vehicle controller, state information of an auxiliary battery while charging the high voltage battery.

The state information of the auxiliary battery may include a discharge current of the auxiliary battery, a temperature of the auxiliary battery, and an SOC of the auxiliary battery.

After sensing the state information of the auxiliary battery, the control method may further include derating, by the vehicle controller, the charging current of the high voltage battery when the sensed state information of the battery satisfies an auxiliary battery derating condition.

The auxiliary battery derating condition is determined by the following equation:

$$I_a < I_b \text{ or } T_a < T_b \text{ or } SOC_a < SOC_b,$$

where $I_a$ denotes a discharge current of the auxiliary battery, $I_b$ denotes a reference discharge current for auxiliary battery derating, $T_a$ denotes a temperature of the auxiliary battery, $T_b$ denotes a reference temperature for auxiliary battery derating, $SOC_a$ denotes an SOC of the auxiliary battery, and $SOC_b$ denotes a reference SOC for auxiliary battery derating.

After derating the charging current of the high voltage battery, the control method may further include determining, by the vehicle controller, whether an SOC of the high voltage battery is equal to or greater than a maximum reference SOC. The charging of the high voltage battery of the vehicle is terminated by the vehicle controller when the SOC of the high voltage battery is equal to or greater than the maximum reference SOC.

The preset converter derating condition is determined by the following equation:

$$I_c < I_d \text{ or } T_c < T_d,$$

where $I_c$ denotes a current of the low voltage DC-DC converter, $I_d$ denotes a reference current for converter derating, $T_c$ denotes a temperature of the low voltage DC-DC converter, and $T_d$ denotes a. reference temperature for converter derating.

The vehicle controller controls a duty ratio of a switch of the low voltage DC-DC converter to perform the derating of the charging current of the high voltage battery.

According to another exemplary embodiment in the present disclosure, a system for charging a high voltage battery of a vehicle includes a high voltage battery and an auxiliary battery. A low voltage DC-DC converter is arranged between the high voltage battery and the auxiliary battery and converts power of the high voltage battery into power for charging the auxiliary battery. A controller is configured to sense state information of the high voltage battery and the auxiliary battery and to charge the high voltage battery using the power of the auxiliary battery by controlling the low voltage DC-DC converter when charging of the high voltage battery is necessary based on the sensed state information.

The controller may perform the derating of a charging current of the high voltage battery when it is necessary to limit the charging current of the high voltage battery by sensing state information of the low voltage DC-DC converter or the state information of the auxiliary battery.

According to the present disclosure, the following effects may be acquired.

First, when the SOC of a high voltage battery is low, the high voltage battery is charged, whereby the performance for starting a vehicle may be secured and cost for replacing the high voltage battery may be reduced.

Second, the durability of an auxiliary battery may be secured through current derating based on the discharge current, the temperature, and the SOC of the auxiliary battery. Further, the durability of a low voltage DC-DC converter may be improved by performing current derating based on the current and the temperature of the low voltage DC-DC converter.

BRIEF DESCRIPTION OF THE DRAWINGS

The above and other objects, features, and other advantages of the present disclosure will be more clearly understood from the following detailed description when taken in conjunction with the accompanying drawings.

DETAILED DESCRIPTION

Hereinbelow, exemplary embodiments in the present disclosure will be described in detail with reference to the accompanying drawings.

Figure 1:
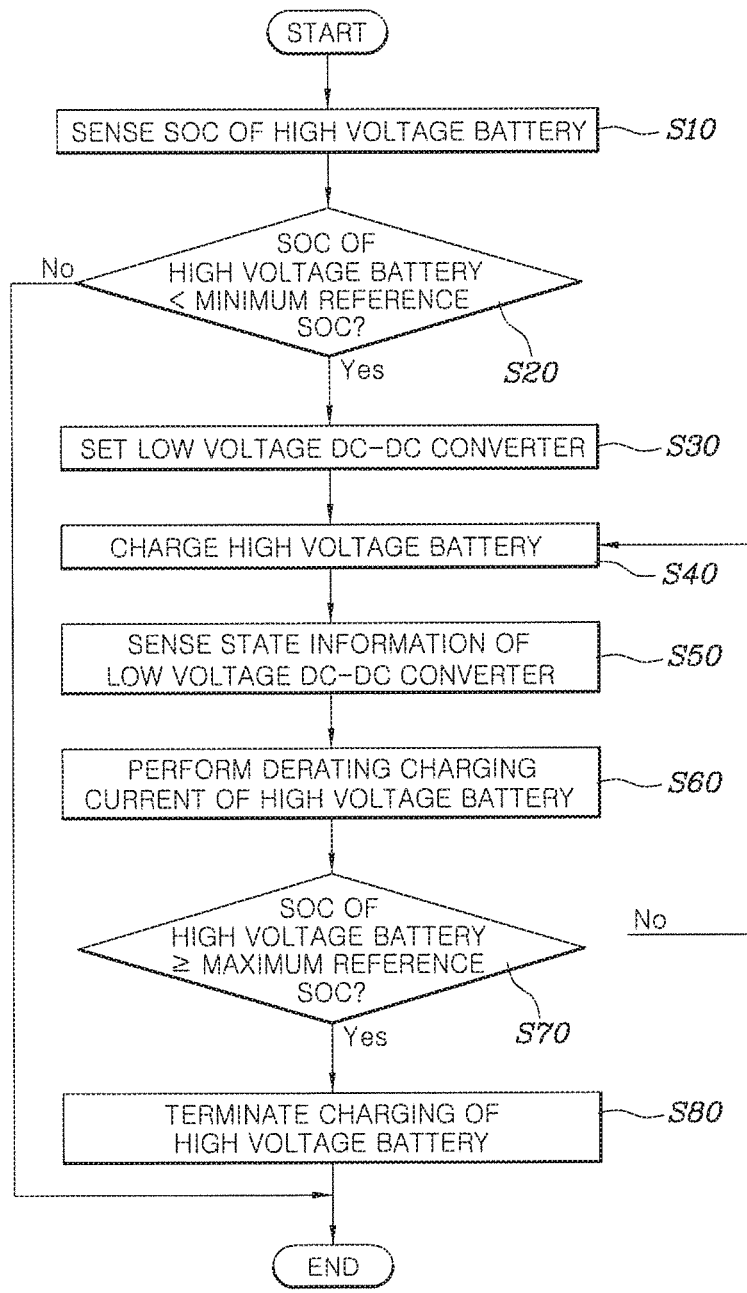
FIG. 1 is a flowchart of a control method for charging a high voltage battery of a vehicle according to an embodiment in the present disclosure.
Figure 2:
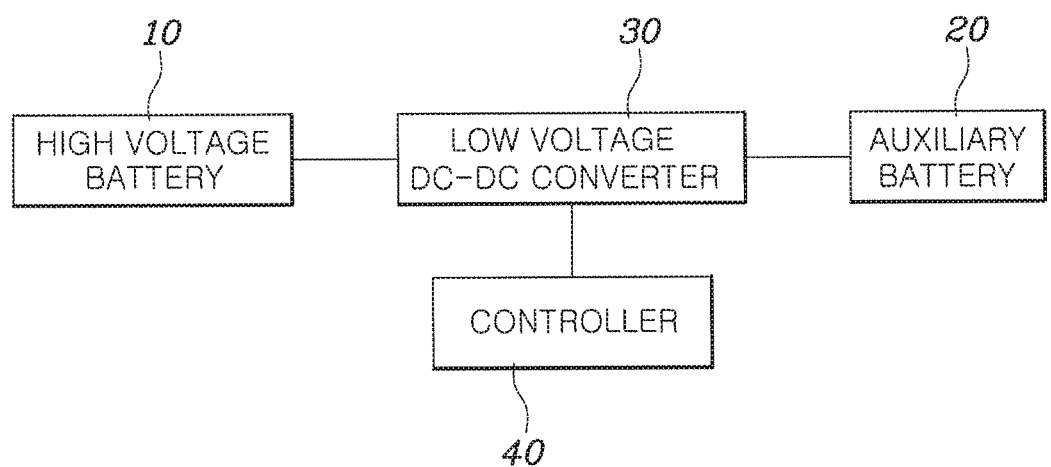
FIG. 2 is a block diagram of a system for charging a high voltage battery of a vehicle according to an embodiment of the present disclosure.

As illustrated in FIGS. 1 and 2, a control method for charging a high voltage battery of a vehicle according to the present disclosure includes sensing, by a vehicle controller 40, a state of charge (SOC) of a high voltage battery 10 (S10). The vehicle controller 40 then compares the sensed SOC of the high voltage battery 10 with a minimum reference SOC (S20). The vehicle controller 40 sets a condition for a low voltage DC-DC converter (LDC) 30 in order to charge the high voltage battery 10 using an auxiliary battery 20 when the sensed SOC of the high voltage battery 10 is less than the minimum reference SOC (S30). The vehicle controller 40 charges the high voltage battery 10 using the LDC 30 (S40). The vehicle controller 40 senses state information of the LDC 30, which includes a current and a temperature of the LDC 30, while charging the high voltage battery 10 (S50). The vehicle controller 40 performs derating of a charging current of the high voltage battery 10 when the sensed state information of the LDC 30 satisfies a converter derating condition (S60).

The control method for charging the high voltage battery 10 uses the auxiliary battery 20 when it is necessary to charge the high voltage battery 10 in which power cannot be supplied to the vehicle from an outside power source. Therefore, before the high voltage battery 10 is discharged, the vehicle controller 40 senses the battery state and charges the high voltage battery 10 temporarily using the auxiliary battery 20, so that emergency driving of the vehicle is possible.

More specifically, step S10 determines the SOC of the high voltage battery 10. Therefore, the vehicle controller 40 senses the SOC of the high voltage battery 10 (S10). An SOC is a criterion for determining a charged state of a battery, in which as the SOC is higher, the battery is closer to a fully charged state.

After the SOC of the high voltage battery 10 is sensed, the vehicle controller 40 compares the SOC of the high voltage battery 10 with the minimum reference SOC at step S20 to determine whether it is necessary to charge the high voltage battery 10. If the SOC of the high voltage battery 10 is less than the minimum reference SOC, it is determined the high voltage battery 10 is in a discharged state. In general, the discharged state is regarded as a state in which an SOC of the high voltage battery 10 is equal to or less than 20% to 30% of a capacity thereof. However, the method for charging a high voltage battery according to the present disclosure charges the high voltage battery 10 for emergency driving under a condition in which the SOC of the high voltage battery 10 is too low to drive a vehicle. Thus, the minimum reference SOC is set to be lower than 20% to 30%. In some embodiments, the SOC is set to be 5% or less but greater than 0%.

When the SOC of the high voltage battery 10 is equal to or greater than the minimum reference SOC as a comparison result from step S20, it is determined that the vehicle is not in an emergency situation so that charging the high voltage battery 10 is not required. Thus, it is not necessary to perform the charging control method of the present disclosure. However, if the SOC of the high voltage battery 10 is less than the minimum reference SOC, the high voltage battery 10 must be charged as described above. In this case, the control method for charging a high voltage battery according to the present disclosure uses the power of the auxiliary battery 20 and sets a condition for the LDC 30 in step S30.

The low voltage DC-DC converter 30 generally converts the power of the high voltage battery 10 into the power of the auxiliary battery 20 in order to charge the auxiliary battery 20 using the high voltage battery 10. However, in the present disclosure, when elements of this converter (for example, switching element) are properly adjusted, not only can the auxiliary battery 20 be charged using the high voltage battery 10, but also the high voltage battery 10 can be charged using the auxiliary battery 20 by converting the power of the auxiliary battery 20 into the power of the high voltage battery 10.

Here, the vehicle controller 40 sets an output voltage command of the LDC 30 to be lower than that of the auxiliary battery 20 and changes a duty ratio of an auxiliary switch of the LDC 30.

In order to charge the high voltage battery 10 using the auxiliary battery 20, a current of the LDC 30 needs to flow in a direction from the auxiliary battery 20 to the high voltage battery 10. Therefore, the current should be applied from the auxiliary battery 20 to the LDC 30, and thus, it is necessary to adjust a voltage of the auxiliary battery 20 or a voltage of the LDC 30. Here, because the voltage of the auxiliary battery 20 is fixed, the voltage of the LDC 30 can be easily adjusted. Therefore, the voltage of the LDC 30 is set at a side of the auxiliary battery 20. That is, the output voltage command of the LDC 30 is sat to be lower than the voltage of the auxiliary battery 20, in which the current is applied from the auxiliary battery 20 to the LDC 30.

When the current is applied from the auxiliary battery 20 to the LDC 30 as described above, a switch of the low voltage DC-DC converter 30 is properly controlled to convert the voltage applied from the auxiliary battery 20 into a voltage for charging the high voltage battery 10. In other words, because it is necessary to adjust the voltage applied from the auxiliary battery 20, the duty ratio of an auxiliary switch of the LDC 30 at an auxiliary battery side is changed, in which the charging voltage of the high voltage battery 10 is generated through the LDC 30.

Here, changing the duty ratio of the auxiliary switch of the converter means that turn-on/turn-off time of the auxiliary switch is changed. Consequently, the magnitude of the current that flows in the auxiliary switch is changed. The changed current of the auxiliary switch is converted through a transformer contained in the converter, and thereby, the current is applied to a primary switch and becomes the current for charging the high voltage battery 10. Therefore, in order to generate a charging voltage of the high voltage battery 10 using the LDC 30, it is important to control the duty ratio of the auxiliary switch of the converter. Accordingly, the control method for charging a high voltage battery changes the duty ratio of the auxiliary switch using a difference between the output voltage command and the voltage of the auxiliary battery 20.

As described above, because the current applied to the LDC 30 is generated by the difference between the voltage of the auxiliary battery 20 and the voltage of the LDC 30, the difference between the voltage of the auxiliary battery 20 and the output voltage of the LDC 30 determines the magnitude of the current. Therefore, the duty ratio the auxiliary switch, which changes the magnitude of the current, may be properly acquired using the difference between the voltage of the auxiliary battery 20 and the output voltage command of the LDC 30.

When the LDC converts the power of the auxiliary battery 20 into the charging power of the high voltage battery 10 using the above-mentioned method, the vehicle controller 40 charges the high voltage battery 10 using the LDC 30 (S40). However, as described above, the charging the high voltage battery 10 using the auxiliary battery 20 may be difficult because the auxiliary battery 20 has a voltage that is lower than that of high voltage battery 10. Accordingly, in order to charge the high voltage battery 10 using the auxiliary battery 20, it is necessary to raise the voltage in the converter. However, raising the voltage of the converter is less efficient than lowering the voltage of the converter. Further, raising the voltage of the converter by intentionally controlling the switch of the LDC 30, which has been manufactured for lowering the voltage, may decrease durability of the LDC 30.

Therefore, it is necessary to limit charging of the high voltage battery 10 using the auxiliary battery 20. Accordingly, the vehicle controller 40 senses the state information of the LDC 30 including the current and temperature thereof while charging the high voltage battery 10 (S50), as illustrated in FIG. 1. The current and the temperature are important criteria for determining the efficiency and durability of the LDC 30, and therefore, state information of the LDC 30 including the current and temperature is sensed. The state information of the LDC 30 may further include a voltage, a duty ratio, and the like of the LDC 30 in addition to the current and the temperature.

When the sensed state information of the LDC 30 satisfies a converter derating condition, the vehicle controller 40 performs derating of a charging current of the high voltage battery 10 (S60). Here, derating means lowering a charging current value of the high voltage battery 10. That is, when the state information of the LDC 30 corresponds to the converter derating condition, which is a condition in which efficiency and durability of the LDC 30 may be degraded, the charging current value of the high voltage battery is limited.

The converter derating condition may be set variously based on the state information of the LDC 30, sensed by the vehicle controller 40. As mentioned above, because the current and temperature of the LDC 30 are the important criteria for determining the state information, the converter derating condition based on the current and temperature of the LDC 30 may be determined by the following equation:

$$I_c < I_d \text{ or } T_c < T_d,$$

where $I_c$ denotes a current of the LDC 30, $I_d$ denotes a reference current for converter derating, $T_c$ denotes a temperature of the LDC 30, and $T_d$ denotes a reference temperature for converter derating.

The set reference current and the reference temperature for converter derating may vary depending on the kind of the converter, a voltage of the high voltage battery 10, and a voltage of the auxiliary battery 20.

In order to determine whether the high voltage battery 10 is charged, the state information of the LDC 30 may be used as described above. However, it is necessary to consider the state information of the auxiliary battery 20 because the voltage source for supplying power to the high voltage battery 10 is the auxiliary battery 20. Therefore, the vehicle controller 40 senses the state information of the auxiliary battery 20 as well as the LDC 30 while charging the high voltage battery 10.

The state information of the auxiliary battery 20 includes a discharge current of the auxiliary battery 20 and a temperature of the auxiliary battery 20, as in the case of the LDC 30. The state information of the auxiliary battery 20 may further include the SOC of the auxiliary battery 20, which is related to the charged state of the auxiliary battery 20. Therefore, after the vehicle controller 40 senses the state information of the auxiliary battery 20 including the above-mentioned information, if the sensed state information of the auxiliary battery 20 satisfies a preset condition for derating the auxiliary battery 20 as in the case of the LDC 30, the vehicle controller 40 performs derating of the charging current of the high voltage battery 10.

The preset condition for derating the auxiliary battery 20 in this step may be determined by the following equation:

$$I_a < I_b \text{ or } T_a < T_b \text{ or } SOC_a < SOC_b,$$

where $I_a$ denotes a discharge current of the auxiliary battery 20, $I_b$ denotes a reference discharge current for derating the auxiliary battery 20, $T_a$ denotes a temperature of the auxiliary battery 20, $T_b$ denotes a reference temperature for derating the auxiliary battery 20, $SOC_a$ denotes an SOC of the auxiliary battery 20, and $SOC_b$ denotes a reference SOC for derating the auxiliary battery 20.

If any one of the condition for derating the LDC 30 and the condition for derating the auxiliary battery 20 satisfied, derating the charging current of the high voltage battery 10 is performed. In the present disclosure, derating may be implemented by a method in which the vehicle controller 40 controls the duty ratio of the switch of the LDC 30. Because the charging current of the high voltage battery 10 is converted through the LDC 30, if the duty ratio of the switch of the LDC 30 is properly controlled as described above, derating the current may be properly performed.

Since the control method according to the present disclosure controls the vehicle under an emergency driving when the high voltage battery 10 is close to a completely discharged state, the high voltage battery 10 may not be consistently charged. Therefore, the control method of the present disclosure charges the high voltage battery 10 to a certain point at which the high voltage battery 10 can avoid the completely discharged state.

After the step of derating the charging current of the high voltage battery 10 is performed, the vehicle controller 40 determines whether the SOC of the high voltage battery 10 is equal to or greater than a maximum reference SOC (S70), and the vehicle controller 40 terminates charging of the high voltage battery 10 when the SOC of the high voltage battery 10 is equal to or greater than the maximum reference SOC (S80).

The set maximum reference SOC vary depending on the kind and state of the high voltage battery 10, the LDC 30, and the auxiliary battery 20. However, if the maximum reference SOC is excessively high, it may adversely affect the efficiency and durability of the LDC 30 and auxiliary battery 20. If it is excessively low, the high voltage battery 10 may not be charged properly. Therefore, it is necessary to set a proper SOC, e.g., 30% of capacity may be determined as the maximum reference SOC.

When it is determined that driving of vehicle is impossible because the SOC of the high voltage battery 10 is too low, the performance for starting of a vehicle can be secured by temporarily charging the high voltage battery 10 through above-mentioned steps. Further, rather than unconditionally charging the high voltage battery 10 using the auxiliary battery 20, the current derating is performed based on the state information of the auxiliary battery 20 and the low voltage converter 30, thus preventing the charging efficiency and durability of electric vehicle devices from being degraded.

The system for charging a high voltage battery of a vehicle according to the present disclosure may include a high voltage battery 10 and an auxiliary battery 20. A low voltage DC-DC converter (LDC) 30 is disposed between the high voltage battery 10 and the auxiliary battery 20 and converts power of the high voltage battery 10 into power for charging the auxiliary battery 20 A vehicle controller 40 is configured to sense the state information of the high voltage battery 10 and auxiliary battery 20 and to control the LDC 30 in order to charge the high voltage battery 10 using the power of the auxiliary battery 20 when charging of the high voltage battery 10 is necessary based on the state information. Here, the vehicle controller 40 may perform derating of a charging current of the high voltage battery 10 when it is necessary to limit the charging current of the high voltage battery 10 based on the state information of LDC 30 or the state information of the auxiliary battery 20.

According to the present disclosure, the following effects may be acquired.

First, when an SOC of a high voltage battery is low, the high voltage battery is charged, in which starting of a vehicle is secured and cost for replacing the high voltage battery is reduced.

Second, durability of an auxiliary battery may be secured through current derating based on a discharge current, a temperature, and an SOC of the auxiliary battery. Further, durability of a low voltage DC-DC converter may be improved by performing the current derating based on a current and a temperature of the low voltage DC-DC converter.

Although exemplary embodiments in the present disclosure have been described for illustrative purposes, those skilled in the art will appreciate that various modifications, additions, and substitutions are possible, without departing from the scope and spirit of the invention as disclosed in the accompanying claims.

What is claimed is:

1. A control method for charging a high voltage battery, the method comprising:
    charging, by a vehicle controller, the high voltage battery using a low voltage DC-DC converter;
    sensing, by the vehicle controller, state information of the low voltage DC-DC converter, which includes a current and a temperature of the low voltage DC-DC converter, while charging the high voltage battery; and
    derating, by the vehicle controller, a charging current of the high voltage battery when the sensed state information of the low voltage DC-DC converter satisfies a converter derating condition.

2. The control method of claim 1, further comprising, before the step of charging the high voltage battery:
    sensing, by the vehicle controller, a state of charge (SOC) of the high voltage battery;
    comparing, by the vehicle controller, the sensed. SOC of the high. voltage battery with a minimum reference SOC; and
    setting, by the vehicle controller, a condition for the low voltage DC-DC converter to charge the high voltage battery using an auxiliary battery when the sensed SOC of the high voltage battery is less than the minimum reference SOC.

3. The control method of claim 2, wherein when the sensed SOC of the high voltage battery is equal to or greater than the minimum reference SOC, the control method ends.

4. The control method of claim 2, wherein the step of setting the condition for the low voltage DC-DC converter comprises:
    setting, by the vehicle controller, an output voltage command to be lower than a voltage of the auxiliary battery; and
    changing, by the vehicle controller, a duty ratio of an auxiliary switch of the low voltage DC-DC converter.

5. The control method of claim 4, wherein the step of changing the duty ratio comprises:
    changing, by the vehicle controller, the duty ratio of the auxiliary switch using a difference between the output voltage command and the voltage of the auxiliary battery.

6. The control method of claim 1, further comprising, after charging the high voltage battery:
    sensing, by the vehicle controller, state information of an auxiliary battery while charging the high voltage battery.

7. The control method of claim 6, wherein the state information of the auxiliary battery includes a discharge current of the auxiliary battery, a temperature of the auxiliary battery, and an SOC of the auxiliary battery.

8. The control method of claim 6, further comprising, after the step of sensing the state information of the auxiliary battery:
derating, by the vehicle controller, the charging current of the high voltage battery when the sensed state information of the auxiliary battery satisfies an auxiliary battery derating condition.

9. The control method of claim 8, wherein the auxiliary battery derating condition is determined by the following equation:

$$I_a < I_b \text{ or } T_a < T_b \text{ or } SOC_a < SOC_b,$$

wherein $I_a$ denotes a discharge current of the auxiliary battery, $I_b$ denotes a reference discharge current for the auxiliary battery derating, $T_a$ denotes a temperature of the auxiliary battery, $T_b$ denotes a reference temperature for the auxiliary battery derating, $SOC_a$ denotes an SOC of the auxiliary battery, and $SOC_b$ denotes a reference SOC for the auxiliary battery derating.

10. The control method of claim 1, further comprising, after the step of derating the charging current of the high voltage battery:
determining, by the vehicle controller, whether an SOC of the high voltage battery is equal to or greater than a maximum reference SOC; and
terminating, by the vehicle controller, the charging of the high voltage battery when the SOC of the high voltage battery is equal to or greater than the maximum reference SOC.

11. The control method of claim 10, wherein when the SOC of the high voltage battery is than the maximum reference SOC, the control method moves to the step of charging the high voltage battery.

12. The control method of claim 1, wherein the converter derating condition is determined by the following equation:

$$I_c < I_d \text{ or } T_c < T_d,$$

wherein $I_c$ denotes the current of the low voltage DC-DC converter, $I_d$ denotes a reference current for the converter derating, $T_c$ denotes the temperature of the low voltage DC-DC converter, and $T_d$ denotes a reference temperature for the converter derating.

13. The control method of claim 1, wherein in the step of derating the charging current of the high voltage battery, the vehicle controller controls a duty ratio of a switch of the low voltage DC-DC converter to perform the derating of the charging current of the high voltage battery.

14. A non-transitory computer readable medium comprising computer executable instructions execution of which causes the vehicle controller to perform the control method of claim 1.

15. A system for charging a high voltage battery of vehicle, the system comprising:
an auxiliary battery;
a low voltage DC-DC converter disposed between the high voltage battery and the auxiliary battery and converting power of the high voltage battery into power for charging the auxiliary battery; and
a vehicle controller configured to sense state information of the high voltage battery and the auxiliary battery and to charge the high voltage battery using the power of the auxiliary battery by controlling the low voltage DC-DC converter when charging of the high voltage battery is necessary based on the sensed state information.

16. The system of claim 15, wherein the vehicle controller performs derating of a charging current of the high voltage battery when it is necessary to limit the charging current of the high voltage battery by sensing the state information of the low voltage DC-DC converter.

17. The system of claim 15, wherein the vehicle controller performs derating of a charging current of the high voltage battery when it is necessary to limit the charging current of the high voltage battery by sensing the state information of the auxiliary battery.

* * * * *